June 28, 1932.　　　F. S. MILLER　　　1,864,607

AUTOMOBILE RUNNING BOARD CARRIER

Filed March 21, 1931

INVENTOR.

BY Frank S. Miller,

H. M. Plaisted
ATTORNEY.

Patented June 28, 1932

1,864,607

UNITED STATES PATENT OFFICE

FRANK S. MILLER, OF ST. LOUIS, MISSOURI

AUTOMOBILE RUNNING BOARD CARRIER

Application filed March 21, 1931. Serial No. 524,249.

This invention relates to certain new and useful improvements in automobile running board carriers, the peculiarities of which will be hereinafter fully described and claimed.

The main objects of my invention are first, to provide a movable receptacle adapted to be used as a carrier for toilet articles, fishing or hunting equipment and the like, that will fit under the running board of an automobile in normal closed position when traveling, and may be swung out laterally for removing, replacing or using the contained articles; second, to provide means for pivotally supporting the ends of such a receptacle so it can be swung under a running board in closed position for traveling, and will avoid obstructing the top of the running board and thus will allow free use of the same; third, to hold said receptacle firmly against the underside of the running board and secure it in closed position for traveling, yet allow ready access to it when desired; and fourth, other objects and features of construction hereinafter described and claimed.

Figure 1:
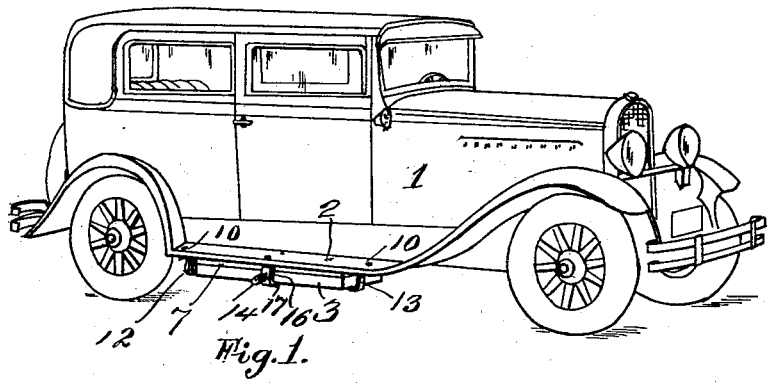
Figure 2:
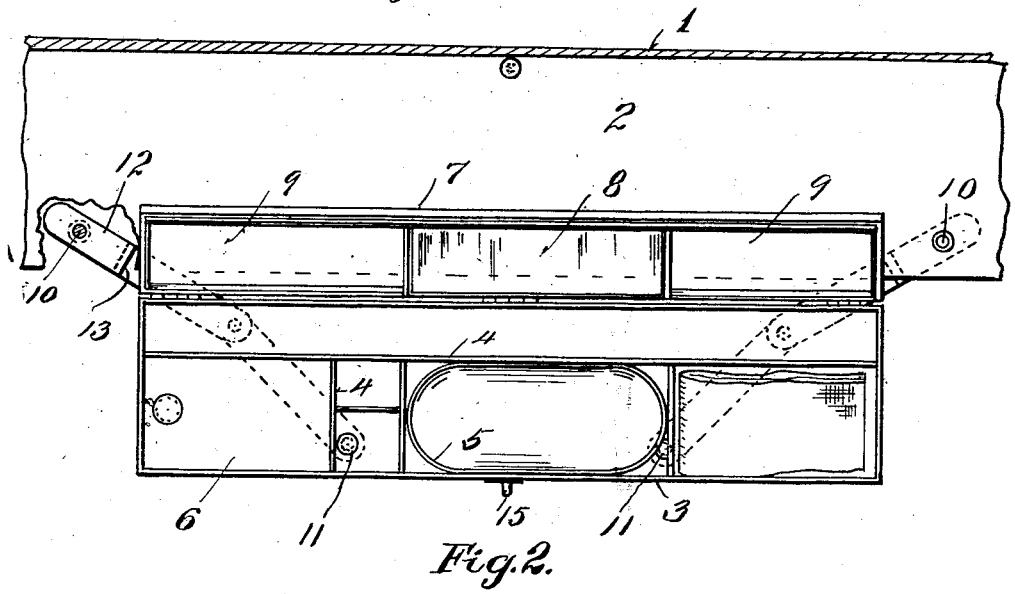

In the accompanying drawing on which like reference numerals indicate corresponding parts, Fig. 1 represents a perspective view of an automobile with my invention applied thereto;

Fig. 2, a detail plan view of my carrier swung out from under the running board, with the lid raised for access thereto; and Fig. 3, a vertical cross section of the running board and carrier near the center as disposed below the running board in closed traveling position.

Various carriers have been provided for use with the automobile running board, such as straps and bars attached to the top or side edge of the running board to hold baggage and like articles carried on the running board. Such carriers even when not in actual use obstruct the top of the running board and interfere with its intended use by the passengers when entering or leaving the machine.

My carrier is movably disposed below the running board, thus leaving the upper side of the running board free and unobstructed for its proper use. My carrier is divided into suitable compartments for articles, utensils and equipment that it is desired to carry in a place where such may be readily accessible upon reaching the destination, and will provide toilet conveniences for instance, that otherwise may be unavailable at the time they are required.

Referring to the drawing, the numeral 1 represents an automobile or other traveling vehicle having a running board 2 that is used as a step by the passengers entering and leaving the machine. Directly beneath the running board is movably mounted my carrier consisting of an elongated box or receptacle 3 divided by partitions 4 into suitable long and short compartments adapted to receive fishing rods and hunting equipment, and toilet articles such as wash bowl 5 and water tank 6 and other convenient or necessary articles.

This box is preferably provided with a lid 7 hinged or otherwise mounted on the box and having a mirror 8 mounted therein opposite the bowl for convenience in use, and also provided with compartments 9 for reception of maps or travel circulars.

Means for supporting the said receptacle in its normal closed position under the running board, and also when laterally adjusted for access thereto, preferably consist of horizontal arms pivotally connecting the underside of the running board with each end of the receptacle. These arms are preferably in two members, jointed together, and the first member 12 connected by a pivot 10 to the underside of the running board near the front, and to the outer member, which latter is secured by a pivot 11 to the bottom of the said receptacle or other suitable portion thereof. The first member 12 has a vertical shoulder 13 substantially the depth of the receptacle, to allow of the preferred attachment of the outer end of the arm to the bottom of the receptacle as shown.

The lid in its closed position is pressed against the underside of the running board and the receptacle can not be opened until laterally adjusted from beneath the running board, to allow the lid to be raised or otherwise give access thereto.

Thus when the receptacle is disposed beneath the running board it is closed and suitable fastening means for holding it in such located position are provided, such as a padlock 14 and staple 15 in the front of the receptacle securing a hasp 16. This hasp is preferably hinged to the running board as shown in Fig. 3, and is provided with a lip 17 extending under the bottom of the box in fastening position, preferably near the middle of the box so as to assist in holding the box firmly to the underside of the running board.

Figure 3:
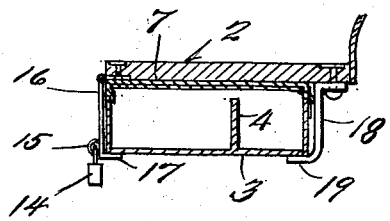

I also preferably provide one or more brackets 18 depending from the running board at the back of the box and having a horizontal lip 19 engaging the bottom of the box to hold the back of the box firmly against the underside of the running board when in its normal position, shown in Figs. 1 and 3.

I do not confine myself to the exact construction here shown and described, except by the appended claims.

I claim:

1. The combination with an automobile running board, of a carrier comprising a movable elongated receptacle divided into compartments and having a lid, horizontal jointed arms of two members supporting each end of the receptacle, one member having a vertical shoulder substantially the depth of the receptacle and pivoted to the underside of the running board and the other member pivoted to the bottom of the receptacle and to the first member, and means to secure said receptacle in its normal closed position below the running board, substantially as described.

2. The combination with an automobile running board, of a movable elongated receptacle divided into compartments as described having a hinged lid, horizontal arm members pivotally connected by their ends to the underside of the running board and to the bottom of the receptacle respectively adapted to support the receptacle when it is disposed in normal position beneath the running board and also when swung out laterally and the lid is raised for access thereto, a staple in the front of the receptacle, a hasp hinged to the running board and having a lip adapted to fit below and support the middle of the receptacle and having a slot for receiving said staple, a fastening means for said hasp, and a vertical bracket depending from the running board at the back of said receptacle and having a horizontal lip engaging the bottom of the receptacle when disposed in normal position, the hasp and bracket being adapted to support said receptacle at the front and back and hold it firmly against the underside of the running board in normal position, substantially as described.

In testimony whereof I have affixed my signature.

FRANK S. MILLER.